United States Patent [19]
Lie

[11] Patent Number: 5,921,570
[45] Date of Patent: Jul. 13, 1999

[54] WELD-ON AXLE BRACKET WITH U-BOLT CONNECTION

[75] Inventor: Tjong T. Lie, Naperville, Ill.

[73] Assignee: The Boler Company, Itasca, Ill.

[21] Appl. No.: 08/754,539

[22] Filed: Nov. 21, 1996

[51] Int. Cl.$^6$ .................................................. B60G 11/00
[52] U.S. Cl. ..................................... 280/124.175; 267/52
[58] Field of Search .................................... 280/686, 688, 280/713, 718, 124.163, 124.17, 124.175; 180/905; 267/52

[56] References Cited

U.S. PATENT DOCUMENTS

| | | | |
|---|---|---|---|
| 1,881,408 | 10/1932 | Moon | 280/718 |
| 3,575,441 | 4/1971 | Arning et al. | 280/697 |
| 4,687,224 | 8/1987 | Selzer | 280/718 |
| 4,902,035 | 2/1990 | Raidel | 280/713 |
| 5,015,004 | 5/1991 | Mitchell | 280/704 |
| 5,119,543 | 6/1992 | Reilly | 280/718 |
| 5,346,247 | 9/1994 | Snyder | 280/712 |
| 5,476,251 | 12/1995 | Moses | 280/688 |

*Primary Examiner*—Daniel D. Wasil
*Attorney, Agent, or Firm*—Lockwood, Alex, Fitz-Gibbon & Cummings

[57] ABSTRACT

A system for mounting a vehicle axle housing to a vehicle suspension member, such as a main support member, Z-spring or a gooseneck spring, is disclosed. The invention utilizes a bracket welded onto the axle housing so as to eliminate excessive compressive stresses on the axle housing. The suspension member is sandwiched between a top pad and an axle seat. A pair of downwardly extending U-bolts have their bight portions seated on the top pad with their distal ends extending through holes in the axle bracket. Nuts are attached to the U-bolt distal ends to secure the entire assembly together. The system can accommodate a variety of axle seat sizes which in turn allows for a variety of pinion angles to be effected without necessitating the use of a different axle bracket design for each pinion angle.

8 Claims, 3 Drawing Sheets

WELD-ON AXLE BRACKET WITH U-BOLT CONNECTION

BACKGROUND AND DESCRIPTION OF THE INVENTION

1. Field of the Invention

The present invention relates generally to vehicle suspension systems and, more particularly, to a means for, and method of, mounting a truck suspension member to a truck axle housing.

2. Discussion

The subject invention finds particular utility in the heavy, medium and light duty truck and trailer industry. In this industry, common suspension installations have for a long time featured axles attached to single leaf spring assemblies.

Recently, the use of air-ride beam-type suspensions in the truck and trailer industry has become quite popular. Such suspensions come in various forms. Generally speaking, however, they include a pair of longitudinally extending flexible beams, one each of which is located adjacent to one of the two longitudinal side frame rails located underneath the body of the truck or trailer chassis. These beams, sometimes called main support members, Z-beams or gooseneck springs, are then pivotally connected at one end to the frame hanger that is attached to the adjacent frame rail of the vehicle. Spaced along the beam at a distance from the frame hanger is an air bag (bellows) and an axle. Examples of this type of suspension are the Hendrickson HA/HAS series suspension and the suspension disclosed in Snyder U.S. Pat. No. 5,346,247 issued Sep. 13, 1994.

In such air-ride beam-type suspensions, a square axle housing is typically secured to each main support member by clamping the axle housing using a bracket assembly comprised of a pair of U-bolts, a top pad, an axle seat, a bottom cap and attaching nuts. In such an arrangement, the main support member is clamped between the top pad and the axle seat while the axle housing is clamped between the axle seat and the bottom cap. The U-bolts typically pass over the top pad and through the bottom cap and clamp the entire assembly together via the attaching nuts.

While the use of such bracket assemblies to attach truck axles to suspension members has proven for a long time to be effective, the clamping load exerted upon the axle housing by the top seat and bottom cap is tremendous. As a result, the relatively thin-walled axle housing will yield to some degree which results in a required retorquing of the attaching nuts on the U-bolts in the field every 15,000 miles or so of truck usage.

Furthermore, due to the sensitivity of the axle housing to the magnitude of the clamping force, proper detailed torque-up procedures for installation and maintenance are desirable. If the compressing clamp load of the U-bolts is not properly performed when the suspension is installed or during maintenance, the axle housing could become overstressed due to the dynamic loads introduced during operation, and seriously deform. As a result, the clamp assembly would loosen if not retorqued and eventually come apart.

It is thus desirable to have an axle bracket assembly that removes the clamping compressive forces from the axle housing. By removing the yielding member (the axle housing) from the clamping forces exerted by the U-bolts, the necessity of retorquing the attaching nuts on the U-bolts in the field would be minimized or even possibly eliminated all together.

A further disadvantage of existing bracket assemblies is that they feature many separate parts. The multitude of parts increases the difficulty of handling and installation. The technician or serviceman is forced to keep track of, handle and align during assembly the many different parts. It would save the technician or serviceman valuable time if he or she were able just to handle a main support member that could be bolted as-is to the axle.

Adjustment of the axle pinion angle with existing bracket assemblies can also prove to be difficult. Because the top of the axle housing is seated in a top seat and the bottom of the axle housing is seated in a bottom seat, both the top seat and bottom cap must be specifically designed and coordinated with one another in order to obtain the proper axle pinion angle. It would thus be desirable to have an axle bracket assembly that more easily adapts to various pinion angle installations.

Accordingly, an object of the invention is to provide a system of mounting suspension members on vehicle axles so that minimal or no compressive forces are exerted upon the axle housings.

Another object of the invention is to provide a system of mounting suspension members on vehicle axles which offers ease of handling and installation.

Still another object of the invention is to provide a system of mounting suspension members on vehicle axles which easily adapts to various pinion angles.

SUMMARY OF THE INVENTION

The present invention is directed to a system for mounting a vehicle suspension member such as a main support member (e.g. gooseneck spring or Z-spring) to a vehicle axle housing. An axle bracket is welded to the axle housing while the vehicle suspension member is sandwiched between a top pad and an axle seat. A pair of U-bolts pass over the top pad and through bores in the axle bracket with attaching nuts securing the U-bolts in place. The U-bolts, as a result, hold the entire assembly together. Through the use of hemispherical bores and spherical washers beneath the attaching bolts, a single axle bracket can accommodate various axle seats giving various pinion angles. Additionally, bands may be used to secure the top pad and axle seat onto the main support member prior to assembly to simplify shipment and handling.

For a more complete understanding of the nature and scope of the invention, reference may now be had to the following detailed description of embodiments thereof taken in conjunction with the appended claims and accompanying drawings.

DESCRIPTION OF THE PREFERRED EMBODIMENT

Figure 1:
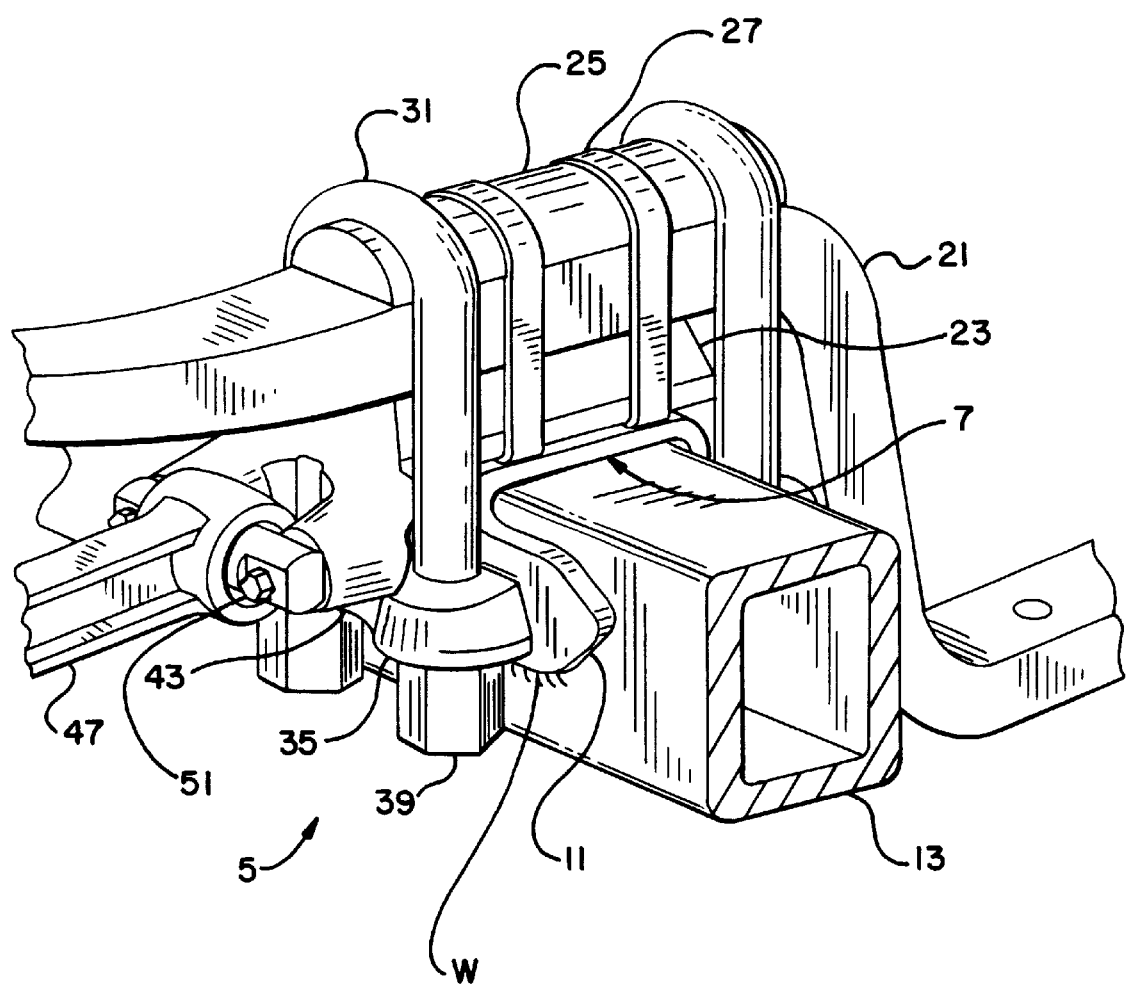
FIG. 1 is an isometric view of an embodiment of the present invention.
Figure 2:
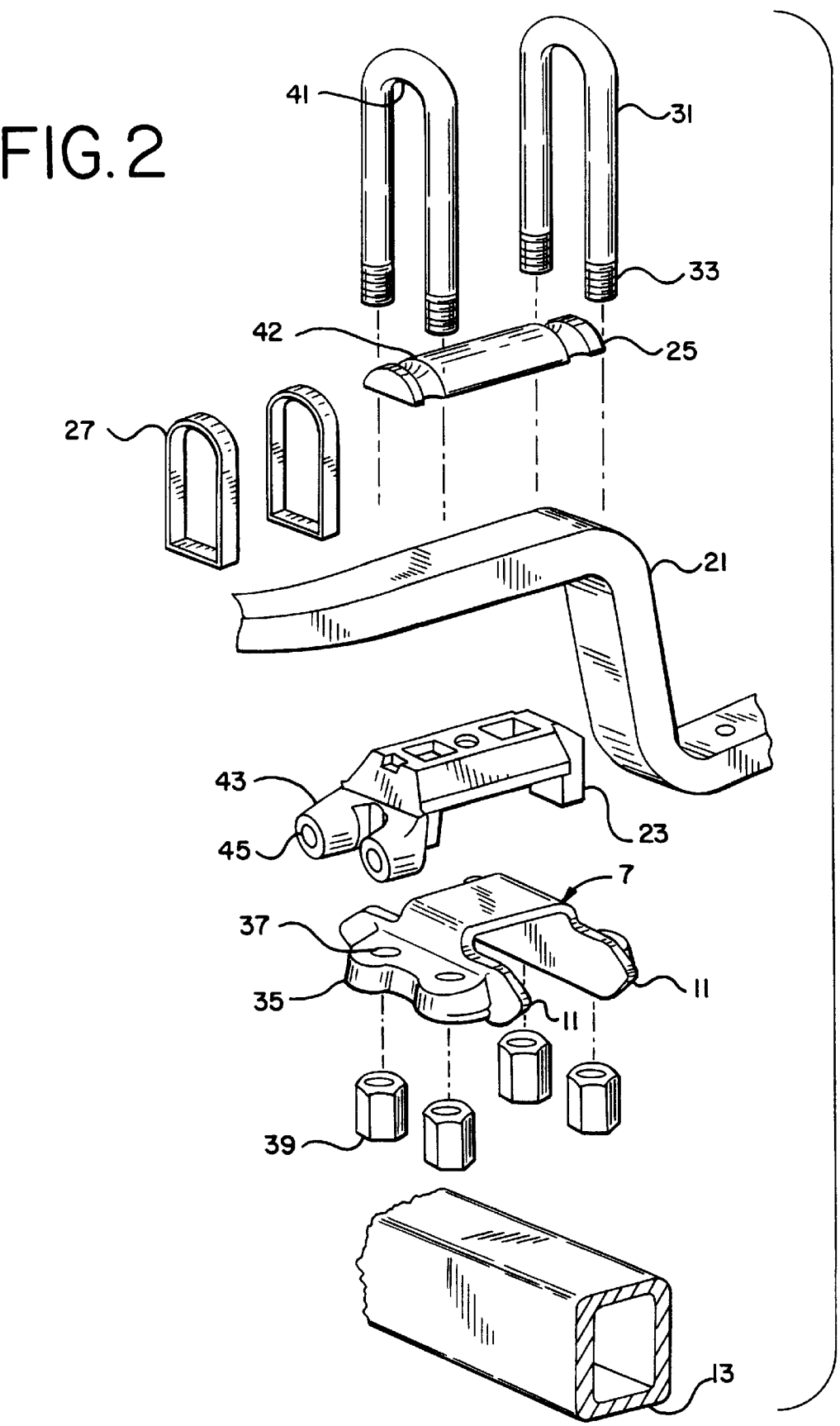
FIG. 2 is an exploded view of the embodiment of FIG. 1.

Referring to FIG. 1, an embodiment of the system for mounting a vehicle suspension member to a vehicle axle housing in accordance with the present invention is indicated generally at 5. As shown in FIGS. 1 and 2, an axle bracket, indicated generally at 7, features downwardly extending flanges 11—11. Flanges 11—11, as shown in FIG. 1, are attached at their inner surfaces to the front and back surfaces of axle housing 13 by welding indicated at W. By this manner of attachment, the compressive forces exerted upon axle housing 13 by conventional clamping arrangements are avoided.

As shown in FIGS. 1 and 2, suspension member 21 is sandwiched between an axle seat 23 and a top pad 25. As such, it may be desirable for a manufacturer to sell these three components together as a package. In such a case, to ease handling and shipping of suspension member 21, axle seat 23 and top pad 25, bands 27 may be used to hold the three components together so that they may be moved as a single unit prior to installation. The bands could remain in place after installation without any adverse effect.

Bands 27 may be constructed of an elastomeric material. This would allow the bands to be stretched as they are positioned around the three components. Alternatively, bands 27 may be constructed of a plastic that may be heated, the bands 27 then positioned around the three components, and then cooled so as to fit snugly. Bands 27 may also be made of metal and a clip may be used to secure them tightly around the three components. Such a clip could also be used if the bands were constructed of plastic strips.

As shown in FIG. 1, Axle seat 23, top pad 25 and suspension member 21 are clamped to axle bracket 7 by way of U-bolts 31. FIG. 2 shows that the distal ends of U-bolt 31 feature threads 33. Furthermore, axle bracket 7 features outward extending flanges 35 that have holes 37 bored therethrough. During assembly, threaded distal ends 33 of U-bolt 31 pass through holes 37 of axle bracket 7. The entire assembly is then held together by nuts 39 secured onto U-bolts 31 by threaded distal ends 33. The bight portions 41 of U-bolts 31 seat in grooves 42 of top pad 25 after assembly.

As shown in FIGS. 1 and 2, axle seat 23 may include bifurcated formation 43. As FIG. 2 illustrates, bifurcated formation 43 contains threaded holes 45. This allows for attachment of torque rod 47 via bolts 51, as shown in FIG. 1.

Figure 3:
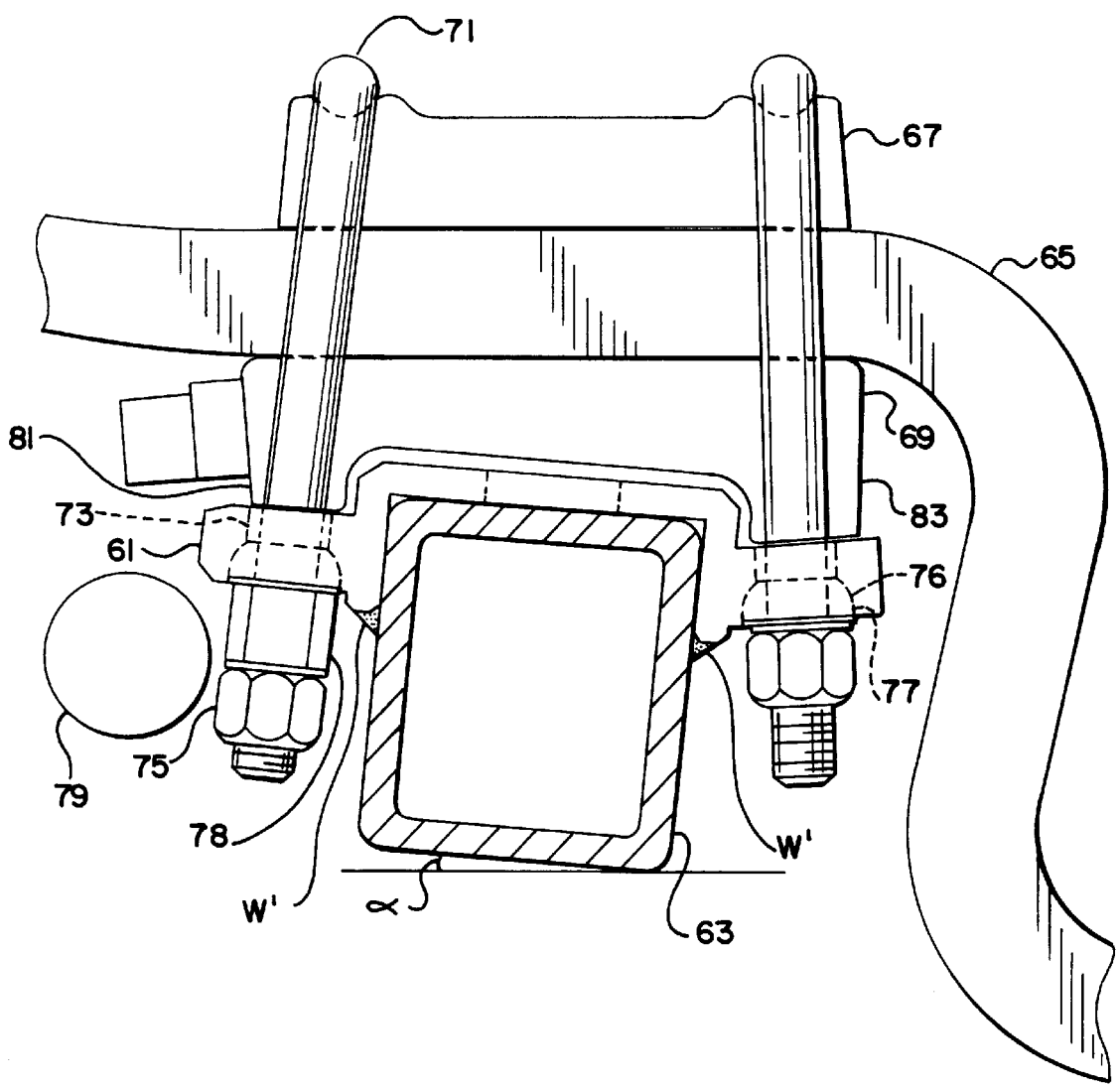
FIG. 3 is a side elevational view of another embodiment of the present invention.

FIG. 3 illustrates how various axle pinion angles can be obtained with the system of the current invention. In FIG. 3, as in the previous embodiment, axle bracket 61 is welded to axle housing 63 and suspension member 65 is sandwiched between top pad 67 and axle seat 69. The entire assembly is held together by downwardly extending U-bolts 71 passing through holes 73 in axle bracket 61 and secured by nuts 75.

As shown in FIG. 3, the diameters of axle bracket holes 73 may be larger than the diameter of the cross section of U-bolts 71. Furthermore, the axle bracket holes 73 may also feature hemispherical socket portions 76 that receive and mate with so-called spherical washers 77. As a result, axle bracket 61 is able to accommodate a variety of axle seat 69 sizes and shapes as the arrangement allows U-bolt 71 to be adjusted to a suitable position with respect to axle bracket 61. Spacer 78 may be added to U-bolt 71 between spherical washer 77 and nut 75 so that nut 75 clears other vehicle components, such as brake tube 79. This allows nut 75 to be accessible by a wrench.

As shown in FIG. 3, axle seat 69 features front downward extending portion 81 and rear downward extending portion 83. As is apparent from FIG. 3, manipulation of the vertical lengths of front portion 81 and rear portion 83 of axle seat 69 allows a variety of pinion angles ≃ to be obtained. An added benefit to this sort of arrangement is that a single type of axle bracket 61, U-bolt 71 and top pad 67 can be used in a variety of installations where various pinion angles are required.

Having described the invention generally in detail in connection with the drawings, including presently preferred embodiments thereof, those skilled in the art will be able to practice the invention either according to the embodiments disclosed or according to other embodiments without departing from the spirit and scope of the appended claims.

What is claimed is:

1. A system for mounting a vehicle suspension member to a vehicle axle housing comprising at each end of the axle housing:
    a) an axle bracket welded to the axle housing;
    b) an axle seat disposed between the bottom of said suspension member and the top of said axle bracket;
    c) a top pad disposed on top of the suspension member;
    d) downwardly extending front and rear U-bolts, the bight portions of which seat on the top pad; and
    e) means for securing the distal ends of the U-bolts to the axle bracket.

2. The system for mounting a vehicle suspension member to a vehicle axle housing of claim 1 further comprising a band wrapped around the top pad, the suspension member and the axle seat.

3. The system for mounting a vehicle suspension member to a vehicle axle housing of claim 1 wherein said axle seat has a bifurcated formation to which a torque rod may be operatively connected.

4. The system for mounting a vehicle suspension member to a vehicle axle housing of claim 1 wherein the distal ends of the U-bolts are threaded and the axle bracket has a plurality of holes therethrough and one of each of the U-bolt distal ends passes through one of each of the plurality of holes and said means for securing the distal ends of the U-bolts to the axle bracket is a plurality of nuts where one of each of the plurality of nuts in threaded engagement with one of each of the U-bolt distal ends.

5. A system for mounting a vehicle suspension member to a vehicle axle housing comprising at each end of the axle housing:
    a) an axle bracket welded aid the axle housing;
    b) an axle seat disposed between the bottom of said suspension member and the top of said axle bracket;
    c) a top pad disposed on top of the suspension member;
    d) downwardly extending front and rear U-bolts, the bight portions of which seat on the top pad; and,
    e) means for securing the distal ends of the U-bolts to the axle bracket; and wherein the distal ends of the U-bolts are threaded and the axle bracket has a plurality of holes therethrough and one of each of the U-bolt distal ends passes through one of each of the plurality of holes and said means for securing the distal ends of the U-bolts to the axle bracket is a plurality of nuts where one of each of the plurality of nuts is in threaded engagement with one of each of the U-bolt distal ends; and further, wherein the plurality of holes of the axle bracket each includes a hemispherical socket portion and further comprising a plurality of spherical washers, one of each of the plurality of spherical washers disposed upon one of each of the distal ends of the U-bolts between one of each of the plurality of nuts and the axle bracket, the spherical washers received within the hemispherical socket portions of the axle bracket.

6. The system for mounting a vehicle suspension member to a vehicle axle housing of claim 1 wherein the axle housing includes a front side and a back side to which the axle bracket is welded.

7. A method of mounting a vehicle suspension member to a vehicle axle housing comprising:

a) welding an axle bracket to the axle housing;

b) sandwiching the suspension member between a top pad and an axle seat; and c) clamping the top pad, suspension member and axle seat to the axle bracket by way of U-bolts.

8. A kit of parts for use in attaching a vehicle suspension member to a vehicle axle housing comprising:

a) an axle bracket adapted to be welded to the axle housing;

b) an axle seat with a bottom surface shaped so as to engage the top of the axle bracket and a top surface shaped for interfacing with the bottom surface of the suspension member;

c) a top pad with a bottom surface shaped for interfacing with the top surface of the suspension member; and d) a U-bolt sized and shaped for securing the top pad, suspension member and axle seat to the axle bracket when the kit is assembled.

* * * * *